United States Patent [19]
Liu et al.

[11] Patent Number: 5,494,325
[45] Date of Patent: Feb. 27, 1996

[54] ARTICLE CONVERGING/DIVERGING, CHAMFERED WALLS GRIPPING ANVILS

[75] Inventors: King-Heng Liu, Thornhill; Gordon Rife, Schomberg, both of Canada

[73] Assignee: Canadian Space Agency, Saint-Hebert, Canada

[21] Appl. No.: 111,065

[22] Filed: Aug. 24, 1993

[51] Int. Cl.$^6$ ............................................. B25J 15/00
[52] U.S. Cl. ................................... 294/1.1; 294/902
[58] Field of Search .................... 294/1.1, 82.26, 294/82.32, 86.4, 90, 91, 106, 119.1, 902; 244/137.4, 158 R, 161; 269/257, 268, 270, 271, 900, 902; 403/13, 14, 24, 322, 345, 348, 360, 375, 381; 901/30, 31, 39

[56] References Cited

U.S. PATENT DOCUMENTS

| | | | |
|---|---|---|---|
| 2,556,131 | 6/1951 | Wolfson | 269/268 X |
| 2,579,151 | 12/1951 | Lloyd | 269/268 |
| 3,281,179 | 10/1966 | Miller | 294/902 X |
| 5,178,431 | 1/1993 | Voellmer | 294/86.4 |
| 5,320,395 | 6/1994 | Gernhardt et al. | 294/86.4 |

*Primary Examiner*—Johnny D. Cherry
*Attorney, Agent, or Firm*—David J. French

[57] ABSTRACT

Article converging/diverging chamfered walls gripping anvils are provided having two protuberances extending from a body portion. The protuberances have top and bottom chamfered, converging inner sides for gripping a square-bobbin-shaped interface therebetween. The protuberances have diverging notches in their outer walls for locating between top and bottom chamfered protrusions on an interface.

4 Claims, 2 Drawing Sheets

ARTICLE CONVERGING/DIVERGING, CHAMFERED WALLS GRIPPING ANVILS

BACKGROUND OF THE INVENTION

This invention relates to article converging/diverging, chamfered walls gripping anvils.

This invention is particularly useful for providing a pair of gripping anvils for use with a retrieving interface attached to an article orbiting the earth, e.g. a satellite.

One type of interface has been designed for use with relatively smaller orbital replacement units for servicing satellites, see co-pending patent application Ser. No. 8/005,/066, filed Jan. 15, 1993. This interface is square in cross-section in plan view, and has a side view cross-section of chamfered walls similar to that of a sewing machine bobbin, so that gripping anvils can receive, align with and grip opposed chamfered wall corners of the interface.

Another type of retrieving interface has been designed for use with relatively larger orbital replacement units, see co-pending patent application Ser. No. 08/111,061, filed Aug. 24, 1993, now U.S. Pat. No. 5,458,384. This interface is provided with opposed, splayed pairs of protuberances having chamfered inner walls, so that gripping anvils can enter, align with and grip, the pairs of protuberances.

While both of these retrieving interfaces have been found to perform their functions satisfactorily, a difficulty has arisen in that different shapes of gripping anvils are required for each type of interface.

It has already been proposed in FIGS. 1 and 2 of U.S. Pat. No. 4,445,678, dated May. 1, 1984, I. S. George, to provide a pair of V-recessed anvils, a top one of which is an inverted V shape, and can be reversed, so that articles, in this instance of smaller diameter, can be gripped by the same pair of anvils.

While the anvils of George are useful on earth, it would be highly undesirable for an astronaut to have to take a space walk to reverse gripping anvils in order that the anvils can grip different types of orbital replacement unit retrieving interfaces that are necessary for orbital replacement units of different sizes.

There is a need for article diverging/converging, chamfered walls gripping anvils which can grip both of these types of walls without the need for any adjustment being made to one or both of the anvils.

SUMMARY OF THE INVENTION

According to the present invention there is provided an article diverging/converging chamfered walls gripping anvils, each anvil comprising,
a) a body portion,
b) a pair of splayed protuberances extending from the body portion, for, in operation supporting the article, each pair of protuberances forming
   i) a converging recess between them, formed by top and bottom chamfered, inner sides of the protuberances, for, in operation, receiving, mating with and gripping converging, top and bottom chamfered walls on an article, and
   ii) opposed, outer, notched sides with the notches diverging rearwardly from one another on each side of the recess, the notches, in operation, entering between, mating with and gripping diverging, top and bottom chamfered protrusions on an article.

Preferably, the top and bottom chamfered, inner sides are planar, and extend substantially vertically between their chamfers to accurately locate with similar, planar neck portions between the chamfers of the walls on the article received therebetween.

The notches of the opposed, outer notched sides of the pair of protuberances, each comprises two, inwardly tapering, planar sides leading to a flat bottom which accurately locates with a flattened crest between the top and bottom chamfers of the protrusions on the article.

The protuberances may have truncated ends to ensure mating in the i) and ii) modes.

BRIEF DESCRIPTION OF THE DRAWINGS

In the accompanying drawings which illustrate, by way of example, an embodiment of the present invention.

DESCRIPTION OF THE PREFERRED EMBODIMENT

Figure 1:
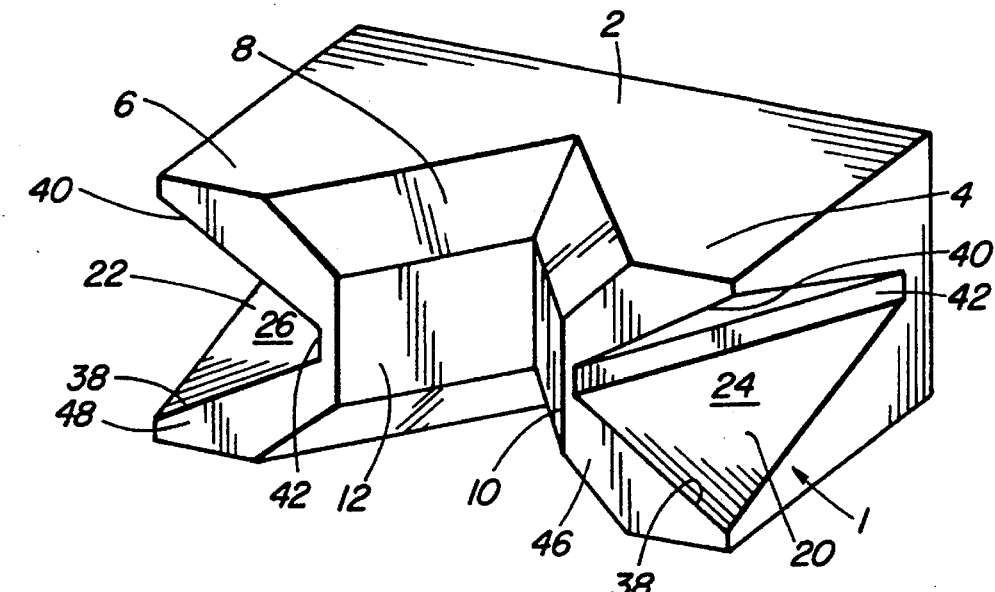
FIG. 1 is a corner view of an article converging/diverging chamfered walls gripping anvil.
Figure 4:
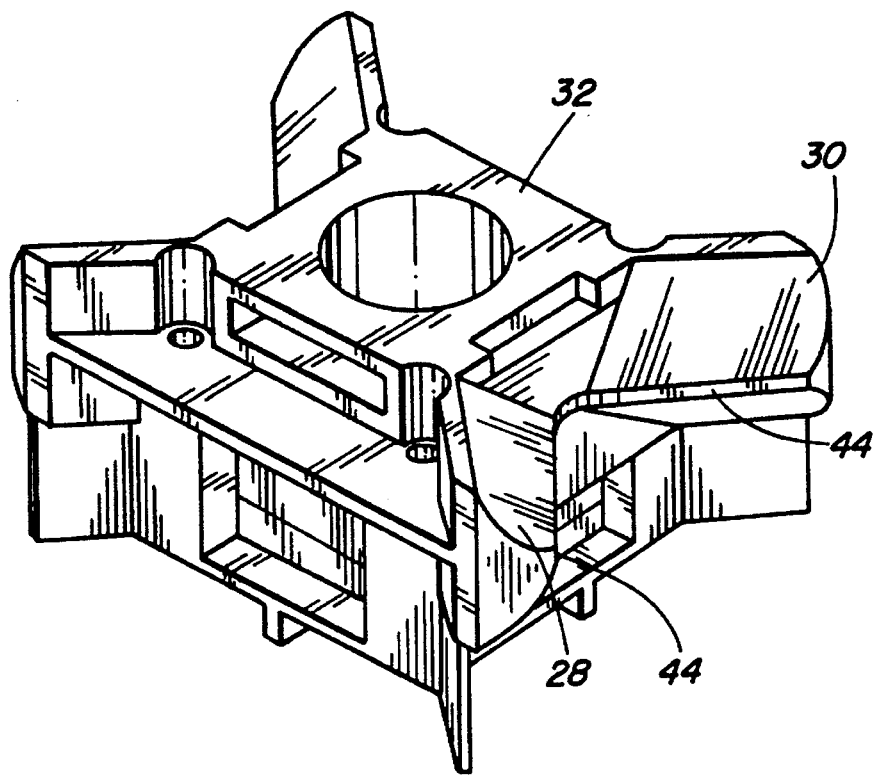
FIG. 4 is a corner view of an interface for use with relatively larger orbital replacement units.
Figure 2:
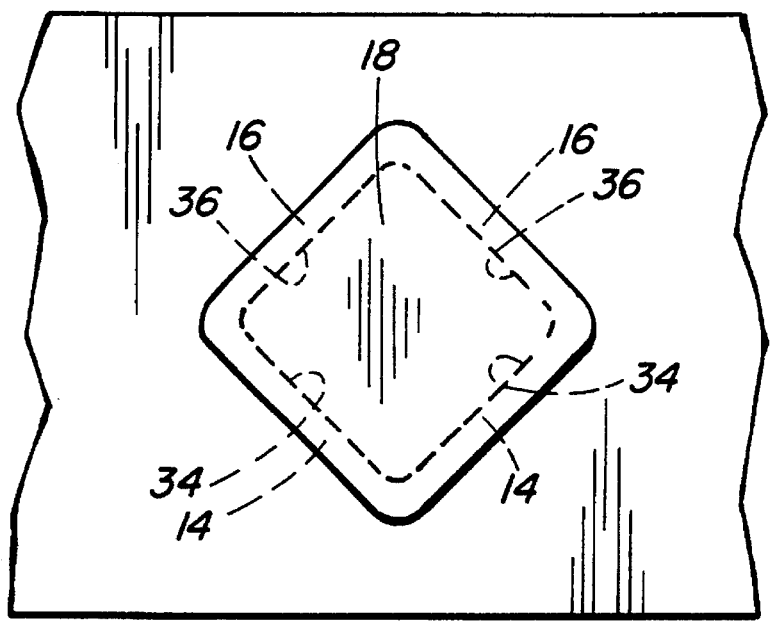
FIG. 2 is a plan view of an interface for use with relatively smaller orbital replacement units.
Figure 3:
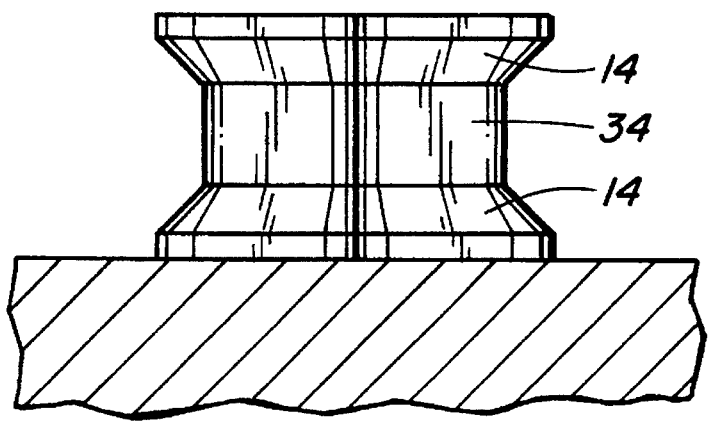
FIG. 3 is a side view of FIG. 2.

In FIG. 1 there is shown a gripping anvil for engaging an article with converging/diverging chamfered walls gripping anvil 1. The anvil 7 has
a) a body portion 2,
b) a pair of splayed protuberances 4 and 6 extending from the body portion 2 for, in operation, supporting first or second articles, to be grasped. Each pair of protuberances delimit
   a rearwardly converging recess 8 between them, formed by top and bottom chamfered, inner sides 10 and 12 of the protuberances 4 and 6, for, in operation, receiving, mating with and gripping converging, inwardly chamfered walls 14 and 16 (FIGS. 2 and 3) on a first article 18 to be grasped.
   As well, each pair of protuberances has opposed, outer, notched sides 20 and 22 with notches 24 and 26 formed therein diverging rearwardly from one another on each side of the recess 8. The notches 24 and 26, in operation, enter between and mate with and grip diverging, outwardly chamfered protrusions 28 and 30 (FIG. 4) on a second article 32 to be grasped.

The top and bottom chamfered inner sides 10 and 12 are planar between the chamfers and extend substantially vertically, to accurately locate with similar, planar waist portions 34 and 36 between the chamfers of the walls 14 and 16 on the article 18 received therebetween.

The notches of the opposed, outer notched sides 20 and 22, of the pair of protuberances 4 and 6, each comprises two, inwardly tapering, planar sides 38 and 40 leading to a flat bottom 42 which accurately locates with a flattened crest 44 between the top and bottom chamfers of the protrusions 28 and 30 on the article 32.

The protuberances 4 and 6 have truncated ends 46 and 48 formed by flat vertical faces 48 to ensure mating in the previously described modes i) and ii).

In operation, two of the anvils 1 are mounted facing one another, for movement towards and away from one another.

When, for example, article 18 (FIGS. 2 and 3) is to be gripped between the anvils 1, the anvils 1 are moved towards one another with the article 18 roughly aligned between the inwardly chamfered walls 14 and 16.

This movement rotatably aligns the chamfered walls 14 and 16 with inner sides 10 and 12 of the protuberances 4 and 6, while, at the same time, the top and bottom chamfers of the inner sides 10 and 12 are brought into vertical alignment with the chamfers of the chamfered walls 14 and 16. With the protuberances 4 and 6 and article 18 mated in this manner, the article 18 can then be firmly gripped between the anvils 1.

When, for example, article 32 (FIG. 4) is to be gripped between the anvils 1, the anvils 1 are moved towards one another with the article 32 roughly aligned between the protuberances 4 and 6. This movement causes the protuberances to enter between the protrusions 28 and 30 so that the outer, notched sides 20 and 22 mate with outwardly chamfered protrusions 28 and 30. This mating rotatably aligns the outer, notched sides 20 and 22 with the protrusions 28 and 30, while, at the same time, causing vertical alignment between the anvils 1 and the article 32. With the article 32 held in this manner, it can be firmly gripped between the anvils 1.

Clearly, if an article is provided with both inwardly chamfered walls 14 and 16, and outwardly chamfered protrusions 28 and 30, then all of these members can mate with the protuberances 4 and 6.

We claim:

1. A gripping anvil for use in grasping an article with diverging or converging chamfered walls such anvil comprising,
   a) a body portion,
   b) a pair of splayed protuberances extending from the body portion for in operation supporting an article to be grasped, said pair of protuberances
      i) forming a converging recess between them, the recess being delimited by converging inner sides having top and bottom chamfered surfaces formed on the protuberances, for, in operation, receiving, mating with and gripping a first article to be grasped having converging, top and bottom chamfered outer walls and
      ii) having opposed, outer, notched sides each having a notch formed therein, said notches diverging rearwardly from one another on each side of the recess, whereby the notches, in operation may enter and mate with and grip a second article to be grasped having diverging protrusions that have chamfered top and bottom outer sides.

2. A gripping anvil according to claim 1, wherein the central portion of the inner sides between the said top and bottom chamfered surfaces are planar, and extend substantially vertically to accurately locate with complimentary planar waist portions on the first article to be grasped.

3. A gripping anvil as in claim 1, wherein the notches on the opposed, outer notched sides of the pair of protuberances each comprises two inwardly tapering, planar surfaces leading to a flat bottom for accurately locating with a flattened crest present between the outer top and bottom chamfered sides of the protrusions on the second article to be grasped.

4. Gripping anvils according to claim 1, wherein the protuberances have truncated ends delimited by planar vertical surfaces.

\* \* \* \* \*